United States Patent [19]

Crandall et al.

[11] 4,229,494
[45] * Oct. 21, 1980

[54] CERAMIC UTENSILS

[75] Inventors: William B. Crandall, Alfred Station; Linda J. Wasserstein, Rockville Centre, both of N.Y.

[73] Assignee: Alfred University Research Foundation, Inc., Alfred, N.Y.

[*] Notice: The portion of the term of this patent subsequent to May 22, 1996, has been disclaimed.

[21] Appl. No.: 7,951

[22] Filed: Jan. 31, 1979

Related U.S. Application Data

[62] Division of Ser. No. 874,141, Feb. 1, 1978, Pat. No. 4,155,788.

[51] Int. Cl.$^2$ .............. A21D 8/06; A23L 1/00; C04B 35/14
[52] U.S. Cl. .............. 428/35; 99/324; 99/426; 156/89; 220/470; 426/523; 428/454
[58] Field of Search .............. 428/35, 454; 156/89; 99/324, 426; 220/470; 264/62; 426/523

[56] References Cited

U.S. PATENT DOCUMENTS

| 1,814,870 | 7/1931 | Tycer | 220/458 |
|---|---|---|---|
| 2,788,561 | 4/1957 | Mueller | 264/62 X |
| 2,813,305 | 11/1957 | Robson et al. | 264/62 |
| 2,910,760 | 11/1959 | Jackson | 264/62 X |
| 3,274,010 | 9/1966 | Caldwell | 156/89 X |
| 3,492,125 | 1/1970 | Ray | 426/523 |
| 3,927,243 | 12/1975 | Thelsen | 428/433 |
| 4,153,491 | 5/1979 | Swiss et al. | 264/62 X |
| 4,155,788 | 5/1979 | Crandall et al. | 428/454 |
| 4,158,684 | 6/1979 | Klawitter et al. | 264/62 |
| 4,158,687 | 6/1979 | Yajima et al. | 264/62 |
| 4,162,334 | 7/1979 | Crandall et al. | 426/523 |
| 4,168,334 | 9/1979 | Crandall et al. | 428/35 |

Primary Examiner—Harold Ansher
Attorney, Agent, or Firm—Schovee & Boston

[57] ABSTRACT

Non-porous, Alfred shale terra sigillata coated ceramic utensils, such as cooking pans, pots, plates, cups and heating and serving dishes, having non-sticking food-contacting surfaces are provided for use in the preparation and/or serving of foodstuffs. The ceramic utensils comprise a ceramic body and an Alfred shale terra sigillata coating on said body, both body and coating preferably being made from Alfred shale.

6 Claims, 2 Drawing Figures

CERAMIC UTENSILS

CROSS-REFERENCE TO RELATED APPLICATION

This is a division of application Ser. No. 874,141, filed Feb. 1, 1978, now U.S. Pat. No. 4,155,788.

This invention is related to copending application Ser. No. 791,507 filed Apr. 27, 1977 now U.S. Pat. No. 4,168,334 by William B. Crandall and Linda J. Wasserstein.

BACKGROUND OF THE INVENTION

1. Field of the Invention

This invention relates to ceramic utensils, particularly to ceramic kitchen utensils, such as, cookware and tableware having an earthenware base coated with a substantially non-porous fired coating of terra sigillata and used in the preparation and/or serving of foodstuffs.

2. Description of the Prior Art

Earthenware kitchen utensils, such as baking, cooking and serving vessels and tableware, such as, plates and cups made from a mixture of starting materials comprising china clay, ball clay, flint and feldspar are well-known. See, for example, *Chemical Technology: An Encyclopedia Treatment*, Dr. J. F. Van Oss, Vol. II, pages 293–313, "Whiteware", for a description of such prior art products and materials and practices used in their manufacture.

In the above copending application, of which the present inventor is a co-inventor, there is disclosed and claimed ceramic cookware, particularly an improved ceramic breadpan, comprising a shaped, fired ceramic body preferably made from Alfred shale and coated with a fired Alfred shale terra sigillata coating composition wherein the Alfred shale terra sigillata coating closes only a portion of the pores of the surface of the body, such as 30% to 95%, and preferably only about 30% to 60% of the pores. The Alfred shale terra sigillata serves there to aid in the ready release of bread from the ceramic breadpan while permitting the ceramic body to impart to the bread a brick oven bread appearance and flavor. A non-porous ceramic utensil of the present invention, because of its non-porous Alfred shale terra sigillata surface, does not provide a means for making a baked bread product with the same taste qualities of the brick oven bread baked in the ceramic breadpan of the above copending application. However, the ceramic utensil of the present invention has enhanced non-sticking properties as more fully described herein.

SUMMARY OF THE INVENTION

The present invention relates to novel non-sticking ceramic utensils, particularly to kitchen utensils, such as cookware, serving ware and tableware. Examples of such utensils are cooking pots, baking and roasting pans, heating and serving dishes, plates, cups and saucers and the like. In particular, a novel ceramic utensil of the present invention comprises a body of a fired ceramic composition having a substantially non-porous coating of fired Alfred shale terra sigillata on at least the surfaces of the body which come into contact with hot or cold foodstuffs. The body and the coating of the utensil preferably are each made from compositions comprising Alfred shale as a major ingredient of the compositions.

The ceramic utensils can be made in the shapes of various kitchen utensils such as pans, pots, serving dishes, plates, cups, heating dishes, and the like. The non-porous coating of the terra sigillata provides each of the various utensils with a food-contacting surface to which food does not stick under the usual conditions to which the respective utensils are normally exposed. In those unusual cases where sticking may occur, the adhered food can readily be removed with a minimum amount of soaking and rubbing with usual cleaning materials. Furthermore, because of the high ferric oxide content of Alfred shale, the ceramic utensils made according to the present invention have an esthetically appealing, warm reddish color.

There is thus provided by the present invention a novel ceramic utensil which is resistant to penetration by food juices arising from the baking, broiling, and/or cooking of various protein or vegetable foodstuffs in the utensil by means of flame heat, electricity or microwaves. Serviceware such as dinner plates, cups and saucers also are hereby provided which are resistant to penetration by foods and their juices.

BRIEF DESCRIPTION OF THE DRAWING

The present invention will be more fully understood by reference to the following detailed description thereof, when read in conjunction with the attached drawing, wherein like reference numerals refer to like elements and wherein.

DESCRIPTION OF THE PREFERRED EMBODIMENTS

Figure 1:
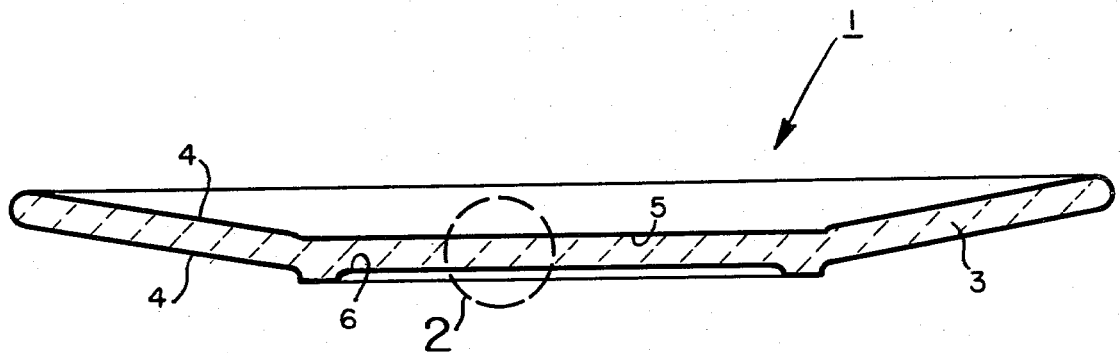
FIG. 1 is a cross-sectional view of a dinner plate of this invention.

With reference now to the drawing, FIG. 1 illustrates a cross-section of a ceramic dinner plate 1 of this invention. The plate 1 comprises a ceramic body 3 and a terra sigillata coating 4 of substantial thickness on the food surface 5 and on the bottom surface 6 of the body 3.

Figure 2:
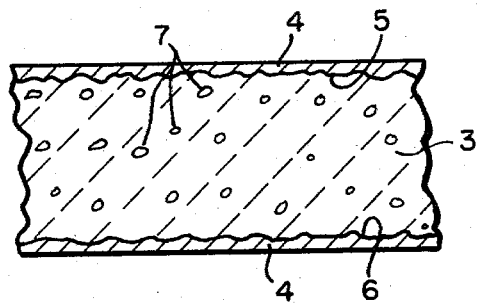
FIG. 2 is an enlarged cross-sectional view of the encircled part 2 of the non-porous terra sigillata coated surface of the dinner plate of FIG. 1.

FIG. 2 shows a section 2 of the ceramic body 3 greatly enlarged and shows layers of flat particles forming the Alfred shale terra sigillata coating 4 on the surfaces 5 and 6, respectively, of the ceramic body 3. The terra sigillata coating 4 entirely covers and seals the pores 7 of the body 3. While the inventors hereof do not intend to be bound by any theory, they believe that the substantially thick Alfred shale terra sigillata coating 4 provides non-stick characteristics to the plate because of the flat nature of the particles and because the coating 4 is of a thickness and firing condition sufficient to form an impervious coating on the fired ceramic body 3. Accordingly, the thickness of the coating 4 is at least $12\mu$ (microns) thick. Preferably, the surface 4 is from 15 to $20\mu$ thick. This thickness of fired coating, fired to maturity, preferably to about cone 03, permits the coating to completely fill the surface pores of body 3 and to provide a durable impervious surface while rendering the surfaces 5 and 6 free from sticking propensities toward foodstuffs and their juices.

The ceramic body 3 of the ceramic utensil of this invention may be made from any of the well-known fire clays and common brick clays used to make earthenware cookware. Chemical compositions of such clays, as well as their compositions in terms of clay/shale minerals, are well known. Typically, such clays consist of hydrous aluminum silicates containing more or less foreign matter such as ferric oxide ($Fe_2O_3$) which contributes the reddish color frequently associated with clay, silica ($SiO_2$) as sand, and calcium carbonate ($CaCO_3$) as limestone. Shales are fine-grained compacted rocks whose original constituents were clays or muds. The chemical composition of shales used to practice this invention therefore is similar to that of the fire and brick clays described above.

A preferred ceramic raw material for making the body 3 of the ceramic utensil is a clay/shale mineral composition found in the State of New York and known as Alfred shale. Alfred shale has a mineral analysis about as shown in Table 1.

TABLE 1

| Mineral | % by Weight |
|---|---|
| Illite | 30+ |
| Muscovite | 5-30 |
| Others, as | |
| Quartz | |
| Chlorite | |
| Feldspar | |
| Biotite | |
| Rutile | |
| Organic material | 40-65 |
| | 100% |

Alfred shale has the following typical chemical analysis:

| Alfred Shale Composition | |
|---|---|
| Ingredient | % by Weight |
| $SiO_2$ | 61.2 |
| $Al_2O_3$ | 19.6 |
| $Fe_2O_3$ | 7.4 |
| MgO | 1.3 |
| CaO | 0.4 |
| $TiO_2$ | 1.0 |
| $Na_2O$ | 1.4 |
| $K_2O$ | 3.7 |
| Loss on ignition | 4.01 |
| | 100% |

It is to be noted that Alfred shale has an unusually high $Fe_2O_3$ content of 7.4% and is lead free. Usual clays used for making ceramic ware, such as whiteware, have less than about 2% of FeO and $Fe_2O_3$ by weight.

The Alfred shale for use in practice of the invention is available in pulverized form. It is screened to provide a dry clay/mineral composition having an average particle size distribution about as shown in Table 2.

TABLE 2

| Ingredient | U.S. Sieve Size | % by Weight retained on |
|---|---|---|
| Alfred Shale | 12 | 0.12 |
| " | 16 | 0.36 |
| " | 20 | 2.3 |
| " | 30 | 5.2 |
| " | 40 | 8.9 |
| " | 50 | 10.5 |
| " | 70 | 9.4 |
| " | 100 | 7.6 |
| " | 140 | 7.6 |
| " | 200 | 14.0 |
| " | 270 | 11.5 |
| " | 400 | 11.0 |
| " | −400 | 11.5 |
| | | 100.0% |

The sized clay/mineral composition is mixed with other usual ingredients advantageous for forming a green clay ceramic utensil body with porosity similar to that of other ceramic bodies.

A typical Alfred shale composition for forming the green utensil body has the following formulation:

| Ingredient | % by Weight |
|---|---|
| Alfred shale (ground) | 80-82 |
| Water | 18-20 |

Preferably, the composition also contains about 0.5% of barium carbonate as an anti-scumming agent. The composition is formed with a green, i.e. unbaked, molding clay in a usual way and the molding clay is shaped into the shape of a desired utensil and dried. For example, a dinner plate, such as that shown in FIG. 1, desirably has a diameter of about 10" and is about 1.5" deep. The size is not critical. A wall thickness of about 3/16" to ¼" is preferably used.

The green molded utensil bodies are fired in a known way at firing temperatures ranging from about pyrometric cone 08 (950°) to about cone 2 (1160° C.) (rapidly heated at 150° C./hr.). Firing temperatures of about cone 06 (1015° C.) to about cone 02 (1125° C.) are preferably used. At the lower firing temperature of 950° C., a shrinkage of about 2% of the body dimensions occurs; at the other extreme, at a firing temperature of 1160° C., a shrinkage of about 10% occurs. In the preferred firing temperature range, the shrinkage is about 6 to 8%. Water absorption or permeability to gases or water of the fired bodies vary inversely to the firing temperatures and range from about 12% water permeability, based on the dry weight of the body, at 950° C. to about 2% at 1160° C. Bodies fired at 1000° C. to 1120° C. (the preferred firing temperature range), have a water permeability of from about 8 to 10%. The degree of permeability can be advantageously controlled by use of the terra sigillata coating of this invention as further described herein.

The non-coated fired ceramic body can be used to bake bread having the taste and physical qualities of oven baked bread, as disclosed in the above-mentioned copending application. However, the porous surfaces of the ceramic body would cause the baked bread to stick somewhat to the baking surface.

The copending application discloses the use of a porous coating of terra sigillata for overcoming the sticking of the "brick oven" bread.

Terra sigillata is a term used to define a fine clay-like material placed upon a ceramic body which can be heated (fired) to produce a satin-like surface on the fired product. For further information regarding the nature of terra sigillata materials and their preparation, one should consult "The Surface Finish of Samian Ware" by J. D. Bestwick and T. S. Smith, Science and Archaeology no. 12 (1974), pages 21-31. Also, reference may be made to "Elegance in Clay-Roman Red-Gloss Pottery from Gaul" by Alison Easson, *Rotunda*, Spring issue 1976, vol. 9, No. 1 pg. 35-40G particularly page 38.

In general, terra sigillata coating composition is a dilute suspension of defloculated particles of finely-divided clay particles obtained by dispersing a selected illite clay in water in the presence of a dispersing agent. Preferably, the clay used is the same clay as that used in the body of the vessel to be coated. In the present invention, the terra sigillata coating is prepared from Alfred shale which is a mixture of illite, muscovite and 40–65% other minerals including organic materials. The dispersing agent can be any of the deflocculating agents used in the art. Preferably, the dispersing agent is a sodium phosphate such as Calgon (tradename for sodium phosphate containing approximately 67% $P_2O_5$).

Terra sigillata coating composition used to make the Alfred shale terra sigillata coating 4 of the present invention preferably has the following initial formulation:

| Alfred Shale Terra Sigillata Coating Composition, Initial | |
|---|---|
| Ingredients | % by Weight |
| Alfred shale (ground) | 20 to 40 |
| Dispersing agent (Calgon*) | 0.01 to 1.0 |
| Water | 60 to 80 |

*Trademark

The Alfred shale mixture shown above, for use in the coating composition of the invention, is ball milled for 24 hours, put in a tank and allowed to settle for 24 hours, and then the light colored top suspension is decanted. The particle size distribution is all below 2 m$\mu$ (microns).

In a preferred embodiment the Alfred shale terra sigillata coating composition is formulated to make a final coating composition having the following ingredients in percent by weight:

| Alfred Shale Terra Sigillata Coating Composition, Preferred | |
|---|---|
| Ingredients | % by Weight |
| Alfred shale (ground) | 25.0 |
| Dispersing agent (calgon) | 0.5 |
| WAter | 74.5 |

The Alfred shale terra sigillata coating composition preferably is applied to the dried ceramic body 3 while the body is at room temperature. The wet Alfred shale terra sigillata coating composition is applied in an amount sufficient to provide a dry fired coating of Alfred shale terra sigillata of at least 0.3 mg/cm$^2$ of surface of body 3. Preferably the wet coating is applied in an amount of 0.3 to 1.5 mg/cm$^2$ of surface, and most preferably, at 0.8 mg/cm$^2$.

The body plus the Alfred shale terra sigillata coating 4 is preferably fired at one time, but multiple firings can be used. There is some memory or a relic of the small flat clay-like particles of shale remaining after firing which causes the fired surface to have a satiny appearance.

After firing, the fired layer of Alfred shale terra sigillata coating ranges from about 12 to 25 microns in thickness. Preferably, the layer of particles will have a fired thickness of from 15 to 20 microns. Single or multiple layers of the Alfred shale terra sigillata coating composition are readily obtained by spraying a coating composition of Alfred shale terra sigillata onto the body surfaces 5 and 6 of the ceramic body 3 to obtain a coverage of from 0.3 to 1.5 mg/cm$^2$, dry basis, and preferably at a coverage of about 0.8 mg/cm$^2$. The thickness of the layer should be at least sufficient to make a non-porous coating over the coated surface of the body 3.

The clay-like particles of Alfred shale best suited for the Alfred shale terra sigillata coating of this invention usually includes a high percentage of illite particles, although other clay-like particles like kaolinite will will also be useful.

The particle size of the separated minerals is usually less than three microns. A few larger particles, if present, will tend to reduce the effect of the finer particles as they lay flat on the surface of the clay body. The dispersed suspension of the particles has a low specific gravity.

A fluid spray of this low specific gravity mass (1.13 gm/cc) allows the clay-like particles to flow easily as they strike the surface of the clay body and permits them to lie down on their flat "plate-like" surfaces.

When the ceramic body coated with the Alfred shale terra sigillata coating composition is fired (heated) to the temperature described, the clay-like particles go through structural changes (macroscopically and microscopically) which destroy the original mineral form. However, there seems to be a "memory" for original clay-like particles, the amount of this memory depending upon the firing procedure and final temperature. A better understanding of this transformation process can be obtained by studying the D.T.A. (Differential Thermal Analysis) of this firing process. (Example in "Ceramic Science for the Potter" by W. G. Lawrence, page 57, published by Chilton Book Company, 1972).

When the ceramic utensil is prepared from an Alfred shale ceramic body composition and Alfred shale terra sigillata coating composition, as described herein, and heated to the temperatures described, the resulting ceramic utensil product has a satin-like non-porous, surface over a porous body. The physical and mechanical properties thus derived impart strength and durability in the body and non-sticking characteristics to the surface so that cooking oils and food juices do not penetrate the surface of the utensil, thus minimizing possible sticking of the food to the surface.

The ceramic utensils of this invention can be decorated in the usual ways with glazes and by using various shaping techniques used in the ceramic ware manufacturing art while obtaining the advantages and benefits of the non-sticking surfaced ceramic utensils hereof.

It is to be understood that the foregoing description of the preferred embodiments of this invention are illustrative only and that changes can be made in the compositions and proportions hereof without departing from the scope of the invention as defined in the following claims.

What is claimed is:

1. A ceramic utensil having a non-sticking food-contacting surface for use in the preparation and/or serving of foodstuffs, comprising a shaped, fired body having a non-porous, fired Alfred shale terra sigillata coating on at least the food-contacting surfaces thereof, said body having been prepared by firing a green clay composition comprising a shale having approximately the following chemical analysis:

| Ingredient | Ave. % by Weight |
|---|---|
| $SiO_2$ | 61.2 |
| $Al_2O_3$ | 19.6 |
| $Fe_2O_3$ | 7.4 |
| MgO | 1.3 |
| CaO | 0.4 |
| $TiO_2$ | 1.0 |
| $Na_2O$ | 1.4 |
| $K_2O$ | 3.7 |
| Loss on ignition | 4.0 |

-continued

| Ingredient | Ave. % by Weight |
|---|---|
|  | 100.0 | and said Alfred shale terra sigillata coating having been prepared by firing on said body a coating composition which has approximately the following formulation:

| Ingredient | % by Weight |
|---|---|
| Alfred shale (ground) | 20 to 40 |
| Dispersing agent | 0.01 to 1.0 |
| Water | 60 to 80 |

2. The ceramic utensil according to claim 1 wherein said Alfred shale terra sigillata coating is fired at a temperature of from about 950° C. to 1160° C.

3. The ceramic utensil according to claim 1 wherein said green clay composition is fired at a temperature of from about 950° C. to 1160° C.

4. The ceramic utensil according to claim 1 wherein said Alfred shale terra sigillata coating closes substantially all of the pores of the ceramic body and has a thickness of from about 12 to 25μ.

5. In a method for cooking a foodstuff, the improvement wherein said foodstuff is cooked in a non-sticking cooking utensil comprising a fired body of Alfred shale having at least the food-contacting surface of said utensil coated with a non-porous dried layer of Alfred shale terra sigillata, said Alfred shale terra sigillata coating of said utensil having been prepared by firing on said body a coating composition having approximately the following formulation:

| Ingredient | % by Weight |
|---|---|
| Alfred shale (ground) | 20 to 40 |
| Dispersing agent | 0.01 to 1.0 |
| Water | 60 to 80 |

6. The method according to claim 5 wherein the dispersing agent is sodium phosphate having approximately 67% $P_2O_5$.

* * * * *